United States Patent [19]

Tamburini

[11] 4,364,607
[45] Dec. 21, 1982

[54] SEAT FOR VEHICLES

[75] Inventor: Pierluigi Tamburini, Castiglioncello, Italy

[73] Assignee: Gilardini S.p.A., Turin, Italy

[21] Appl. No.: 173,140

[22] Filed: Jul. 28, 1980

[51] Int. Cl.³ .................................................. A47C 7/02
[52] U.S. Cl. ........................................ 297/452; 5/402; 5/406; 297/455
[58] Field of Search .................. 5/402, 403, 404, 405, 5/406; 297/452, 455, 456

[56] References Cited

U.S. PATENT DOCUMENTS

| | | | |
|---|---|---|---|
| 1,242,346 | 10/1917 | Haines | 5/402 |
| 1,415,837 | 5/1922 | Green | 5/405 |
| 1,650,294 | 11/1927 | Palmer | 5/406 |
| 1,756,579 | 4/1930 | Wisner | 5/404 |
| 1,764,920 | 6/1930 | Wisner | 5/402 |
| 1,926,089 | 9/1933 | Forbes et al. | 5/403 |
| 2,059,498 | 11/1936 | Stubnitz | 5/404 |
| 2,246,893 | 6/1941 | Nordmark | 5/402 |
| 3,026,145 | 3/1962 | Galbraith | 297/455 |
| 3,040,340 | 6/1962 | Davis | 5/403 X |
| 3,273,178 | 9/1966 | Baruth et al. | 5/403 |
| 3,298,743 | 1/1967 | Albinson et al. | 297/452 X |
| 3,633,968 | 1/1972 | Sears, Jr. | 5/403 X |
| 4,284,305 | 8/1981 | Porter et al. | 297/452 |

FOREIGN PATENT DOCUMENTS

| | | | |
|---|---|---|---|
| 2358270 | 2/1978 | France | 297/452 |
| 223179 | 10/1968 | Sweden | 297/452 |
| 1358952 | 7/1974 | United Kingdom | 297/455 |

Primary Examiner—James T. McCall
Attorney, Agent, or Firm—Frost & Jacobs

[57] ABSTRACT

A seat for vehicles is described. The seat comprises a support structure for a cushion and a support structure for a seat back, as well as a respective stuffing part supported at least partially by the said structure. The main feature of this seat is that the said support structure has a cross-section having a profile such as to allow an engagement of at least partially mating surfaces, one of which pertains to the structure and the other to at least one component of the seat.

4 Claims, 17 Drawing Figures

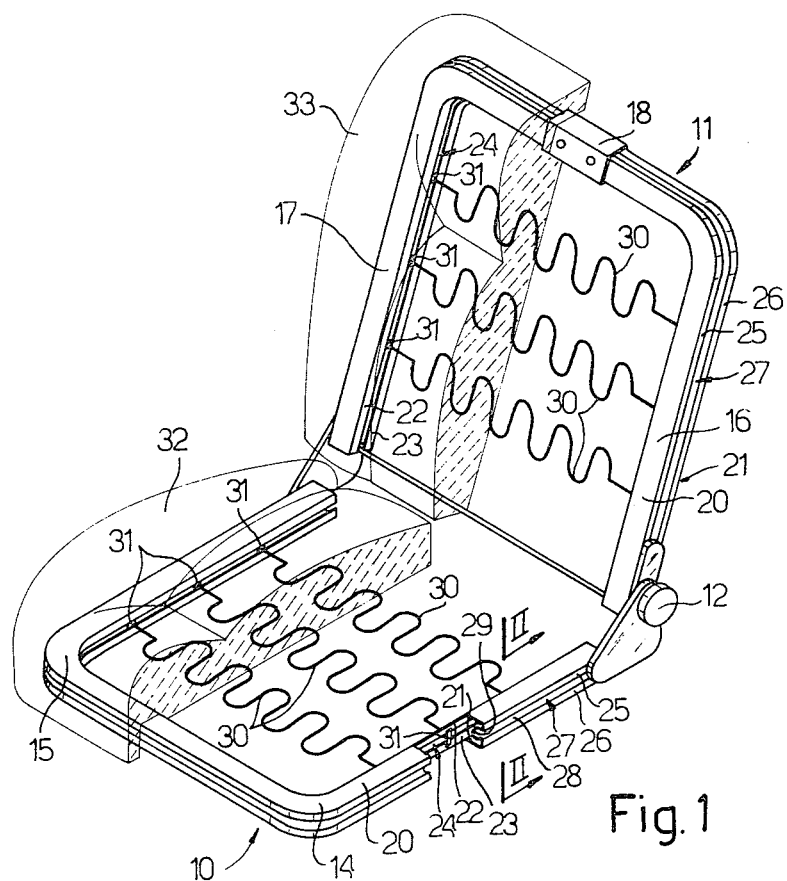
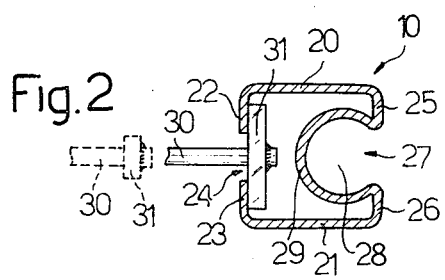

SEAT FOR VEHICLES

BACKGROUND OF THE INVENTION

The present invention relates to a seat for vehicles in general, and preferably for motorcars, carryalls, commercial vehicles, tractors, trains etc.

As is known, the seats for vehicles possess a support structure both for a cushion and a seat back, which structure generally is constructed separately from the stuffing. The stuffing may be manufactured separately in a completely finished condition and can be fixed rapidly on the structure itself, or may be formed at least partially on the support structure, for example by applying an outer coating overall for a stuffing material, and in this case a certain stage of preparation of the terminal edge of the covering is necessary, for example by way of insertion of threads with a seam etc., which will allow fastening the edge in a sufficiently rugged and durable manner.

Moreover, perpendicularly to the plane of the cushion and of the seat back a suspension is created by means of springs whose ends are fixed to the support structure in respective holes generally formed in the support structure; such fastening, however, has the disadvantage of requiring the application of suitable additional parts to the structure or the performance of additional working operations for obtaining the holes.

Furthermore, the support structure may also be provided with lateral support parts or interchangeable parts for allowing dimensional variations etc., which parts, however, require a relatively complex and rather expensive construction.

SUMMARY OF THE INVENTION

The object of the present invention is to provide a seat for vehicles, whose support structure ensures a maximum versatility of application at different conditions of finishing, a relatively simple construction and a high rapidity of assembly, and hence an economy in the total cost of the seat as regards both completely finished stuffings or stuffings with an outer coating and the fastening of the respective springs or the side limitation parts etc.

Other objects and advantages of the seat according to the present invention will be apparent from the following detailed description.

On the base of the present invention there is provided a seat for vehicles, comprising a support structure for a cushion and a seat back, as well as a respective stuffing part supported at least partially by the structure, characterized in that the support structure has a construction which allows an engagement of at least partially mating surfaces, one of which pertains to the structure and the other to at least one component of the seat.

BRIEF DESCRIPTION OF THE DRAWINGS

For a better understanding of the present invention, some different embodiments will now be described more in detail by way of non-limiting examples, with reference to the accompanying drawings, in which:

FIG. 1 is a partial and partially sectional perspective front view of a first embodiment of the seat according to the present invention;

FIG. 2 is a section along line II—II of a portion of the seat shown in FIG. 1;

DETAILED DESCRIPTION OF THE INVENTION

Figure 3:
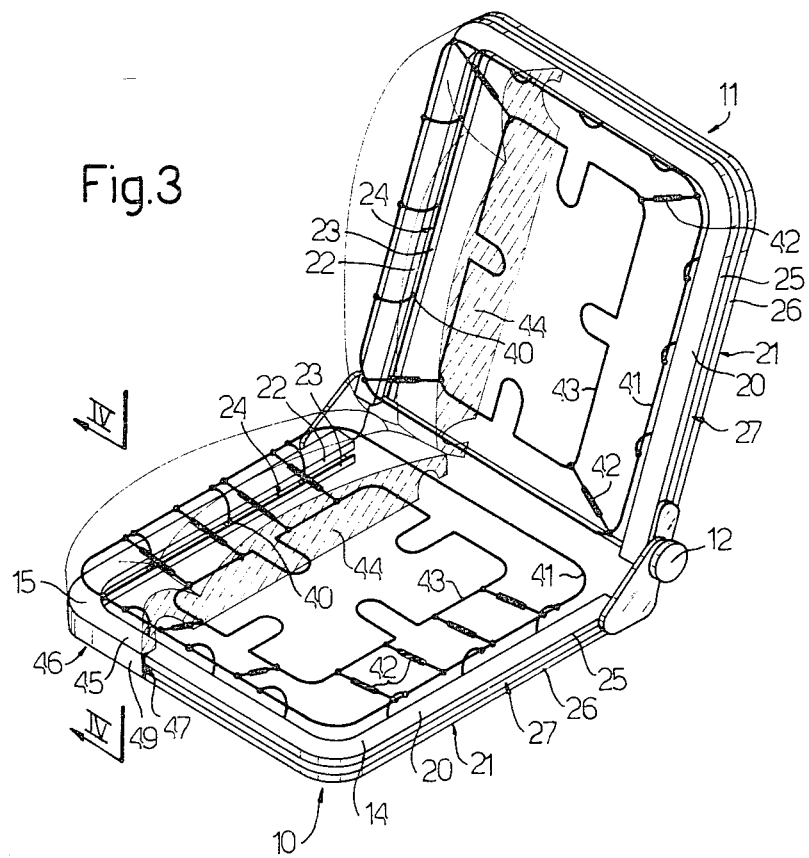
FIG. 3 is a partial and partially sectional perspective front view of a second embodiment of the seat according to the present invention.

Referring now to FIG. 1, a seat for vehicles according to the present invention comprises a support structure 10 for the cushion and a support structure 11 for the seat back whose inclination is adjusted by means of an actuation know actuating an adjustment device of known construction.

The support structures 10 and 11 are perimetrical plane U-shaped structures, with the only difference that the structure 10 is an integral structure bent in two regions 14 and 15, whilst the structure 11 is formed by two parts 16 and 17 connected to one another on their upper side by means of an element 18 of C-shaped cross-section, for example welded on the ends of the parts 16 and 17. However, such configuration is not limiting, and also the structure 11 could be integral or the structure 10 could be made of two parts. Conveniently, these support structures 10 and 11 are made of a section iron and have a construction which is substantially constant throughout the support structure, as partially shown in FIG. 1 and more clearly in FIG. 4. As shown in the section view, the support structure comprises two plane walls, i.e. an upper wall 20 and a lower wall 21, which towards the interior of the structure are bent orthogonally in reciprocal directions, with two portions 22 and 23 defining between them an opening 24. The walls 20 and 21, towards the exterior of the structure, are bent orthogonally in reciprocal directions, with two portions 25 and 26 which define between them an opening 27 for a recessed zone 28 and closed by a wall 29 in the form of a part of a circle and radiused to the ends of the portions 25 and 26 in points of chord smaller than the diameter. In the plane of both the support structure 10 and the support structure 11 there are disposed wave-shaped spring members 30 whose ends have bars 31 fixed thereto which bear on the inner surface of the portions 22 and 23. The said bars 31, in a position turned by 90° and indicated by dashed lines in FIG. 2, are introduced into the opening 24 and rotated for the bearing engagement with the portions 22 and 23.

Applied both on the support structure 10 and the support structure 11 is a stuffing 32 and 33, respectively, shown partially and by finer lines, which stuffing may conveniently be made of an open-celled plastic material, and is obtained by known processes for manufacturing a stuffing of a substantially finished type, also with its coating, and suitable for being applied rapidly on the support structure, for example by means of hooks (not shown) incorporated into the stuffing and partially projecting from it for being hooked onto the spring elements 30, or with rapid attachment elements, for example disposed on the upper wall 20 of support structure. Furthermore, each of said stuffings 32 and 33 may be integral, or it may also be made of a plurality of components for various zones of the seat.

The seat shown in FIG. 3 differs from the seat shown in FIG. 1 not in the shape of the profile of the support structure 10 and 11, which is always the same (except that the structure 11 is integral), but in the different shape of the spring elements 30 which in this case (as a non limiting variant) have a first portion 40, still with the end bearingly engaged on the inner surface of the profile of the structure, through the passage in the opening 24, and which in the upper region is curved and supports a perimetrical frame 41 having springs 42 fixed thereon which at the other end support a more internal frame 43.

Figure 4:
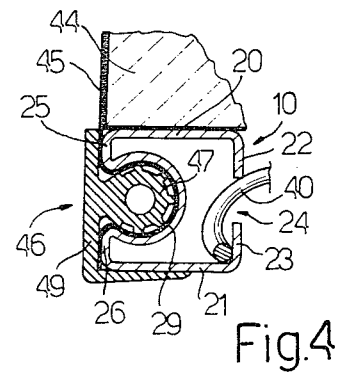
FIG. 4 is a section along line IV—IV showing a portion of the seat shown in FIG. 3.

Bearing on the frames 41 and 42 and on the upper zones of the portions 40 is a stuffing 44 which is provided with a surface coating element 45, for example a sheet of fabric or plastic material, whose end portion is locked in the zone 28, as indicated for the support structure 10, by means of an auxiliary element 46 housed in the said zone 28, as more clearly visible in FIG. 4.

The said auxiliary element 46, which is conveniently formed by a continuous section of plastic material, comprises, in fact, a first portion 47 having a serrated outer profile, which portion is substantially snapped or forced into the zone 28 and thus, with its respective teeth, locks the terminal zone of the surface coating element 45 against the wall 29; it further comprises a second square shaped portion 49 which couples on the outer surface of the portions 25 and 26 and of the lower wall 21 of the support structure, so as to serve as a cover element for the end portion of the surface coating element 35.

Figure 5:
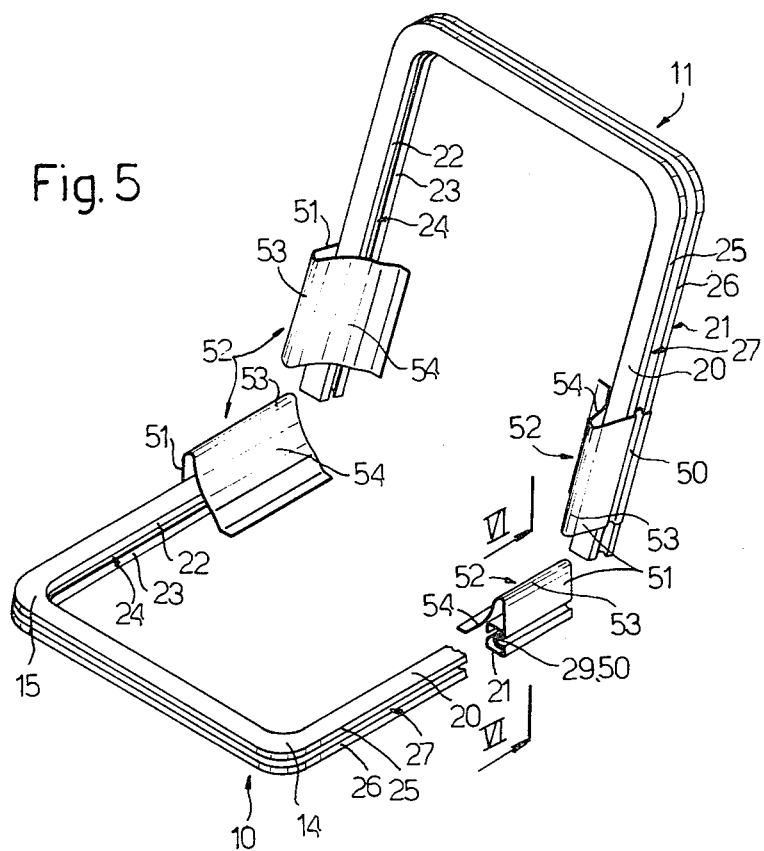
FIG. 5 is a partial and partially sectional perspective front view of a third embodiment of the seat according to the present invention.
Figure 6:
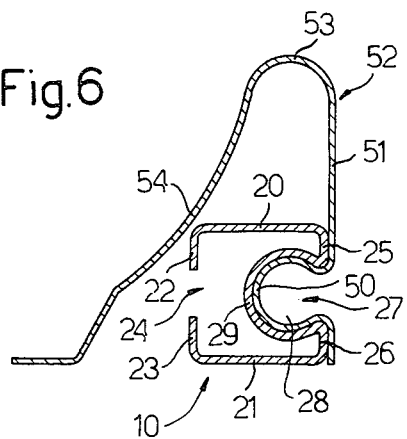
FIG. 6 is a section along line VI—VI, showing a portion of the seat shown in FIG. 5.

The seat shown in FIG. 5 has the feature of having, fixed (convenient by welding) to the wall 29 of the support structures 10 and 11, a wall 50 having the same configuration, pertaining to the lower zone of a vertical wall 51 of an element 52 which, in its upper part, has a curved portion 53 and than forms a descending portion 54 inclined towards the inner zone of the support structure. Conveniently, the said element 52 is made of a metal plate and has function of opposing against the forces acting as components parallel to the plane of the said cushion or the said seat back, so as to obtain a lateral support effect. The length of the said elements 52 may be equal to the length of the side portions of the support structures 10 and 11, or it may be smaller. Disposed on the support structures 10 and 11 and on the elements 52, if such are present, is a stuffing (not shown) which may be of the type shown in FIG. 1, or of the type shown in FIG. 3 with the respective auxiliary element 46, and the spring elements may also be of the type of those shown in FIG. 1 or in FIG. 3.

Figure 7:
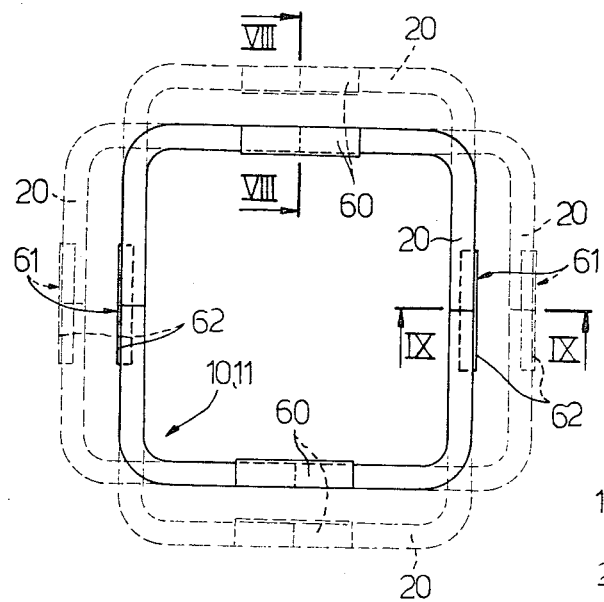
FIG. 7 is a diagrammatic view of a portion of the seat according to the present invention, in various configurations.
Figure 9:
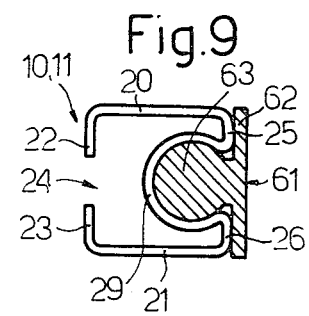
FIGS. 8 and 9 are sections along lines VIII—VIII and IX—IX respectively, of the portion of the seat shown in FIG. 7.
Figure 8:
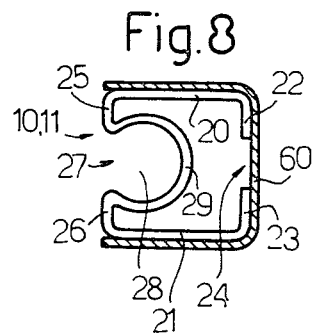

In order to allow a variation of the length of both the support structure 10 and the support structure 11, the support structure itself may be inserted more or less into the element 52, thus obtaining a larger or smaller superimposition of surfaces of the wall 29 with the wall 50, so that the element 52 will form at least partially a portion of the support structure itself. Naturally, the adjusting device for adjusting the position of the seat back, actuated by means of the knob 12, may be fixed between the walls 51 of the seat back. A more complete versatility, generally, as regards the variation of the length and/or the width of the support structure of the cushion and that of the seat back, is illustrated in FIG. 7, in which, with reference to FIG. 8, the support structure may be inserted more or less into an element 60 having a C-shaped cross-section, which element is conveniently fixed to the walls 20 and 21, whilst, with reference to FIG. 9, the realization of a support structure portion is obtained by means of an element 61 having a plane wall 62 fixed on the portions 25 and 26 and a wall 63 having the same cross-section of the zone 28 and fixed to the wall 29.

Figure 10:
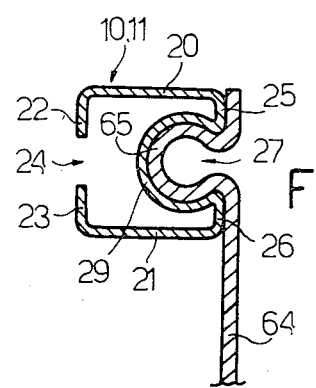
FIG. 10 is a sectional view showing a portion of the seat of the present invention in a particular application.

FIG. 10 shows a general element 64, which may be for example a support foot for supporting the support structure 10 and which is fixed to the support structure 10 by means of the coupling and the fastening of its upper portion 65 to the wall 29 having the same configuration.

Figure 11:
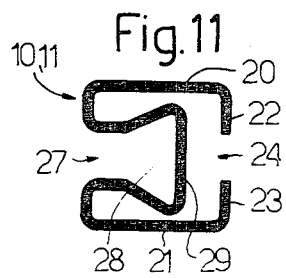
FIGS. 11, 12 and 13 show, by way of example, three different embodiments of a portion of the seat according to the present invention.
Figure 12:
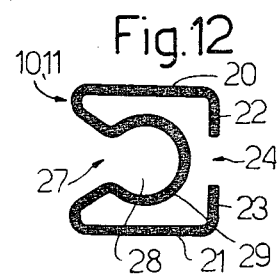
Figure 13:
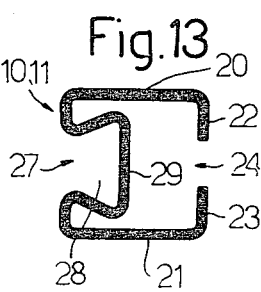
Figure 14:
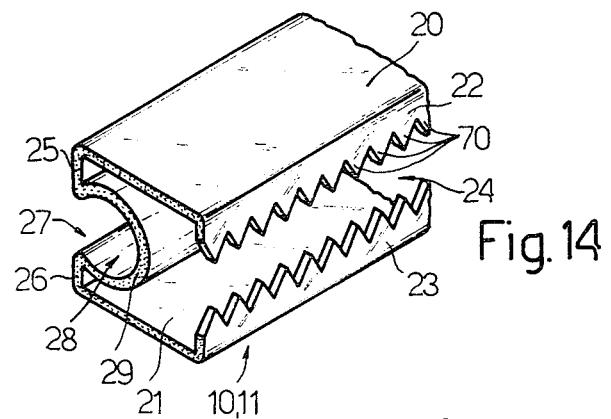
FIGS. 14, 15 and 16 are three partial perspective views of other embodiments of a portion of the seat according to the present invention.
Figure 15:
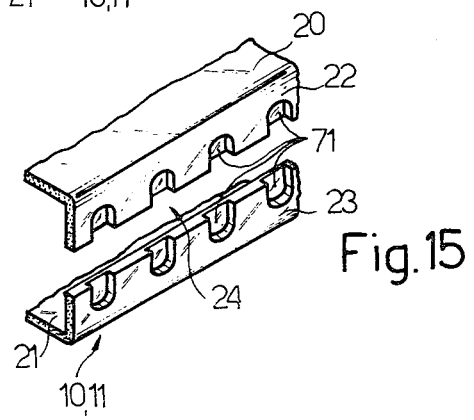
Figure 16:
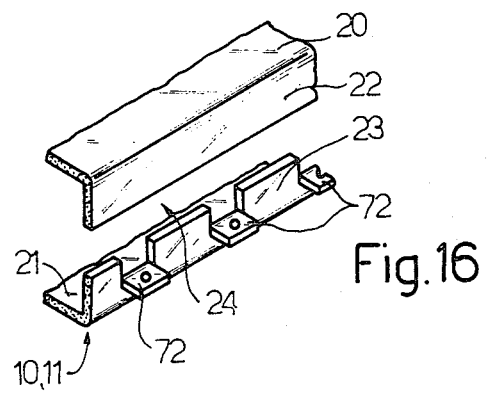

FIGS. 11, 12 and 13 show other embodiments of the profile of the support structures 10 and 11, which embodiments differ substantially in the specific shape of the wall 29, but all of them have the opening 27 having dimension smaller than the maximum dimension of the cavity 28, and moreover in all of them there is present the opening 24. Moreover, the opening 24 may be shaped, for example by means of a step process when coming out from a forming machine which produces the section of the support structure, and may, for example, have a plurality of teeth 70, or projections 71, or overturned tabs 72 (FIGS. 14, 15, 16), i.e. obtained by means of general processes of deformation or removal of material. The said opening 24 shaped in this manner may serve to allow the the direct engagement of any element, for example the end edge of surface coating element of the stuffing, which, instead of being fixed to the auxiliary element 46 (FIGS. 3 and 4), may for example be hooked on the teeth 70.

Figure 17:
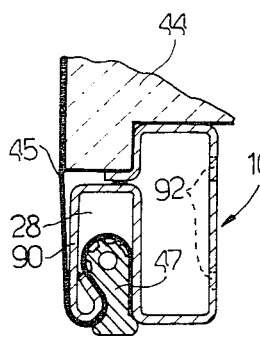
FIG. 17 is a sectional view showing a further embodiment of the seat according to the present invention.

Or also, as shown in FIG. 17, the cavity 28 in which the locking element 46 for locking the end of the surface coating element 45, instead of being formed in a central zone of the section (FIG. 4), may be formed with an end portion 90 of the section conveniently shaped. Also with this portion 90 one obtains an opening having dimensions smaller than the maximum dimension of the cavity 28. In this section there may be provided openings 92 for inserting therein the ends of the spring elements.

Thus, with the seat according to the present invention it is possible to attain the object of providing a support structure possessing a maximum versatility of application at different finishing conditions with considerable simplicity of construction and rapidity of assembly. In fact, owing to the particular profile of the cross-section of the support structure a rapid assembly of the spring elements 30 or the ends of the portions 40, without being compelled to provide holes or add auxiliary parts, and thus the wall 29 or 90 of the recessed zone 28 allows a rapid application of the auxiliary element 46 for a rapid fixing of the end portion of the surface coating element 45 without requiring any supplementary stage of preparation, and/or an easy application of the lateral support elements 52 for the cushion or the seat back, and/or an easy possibility of variation of the length or the width of the seat itself, and/or an easy and ready possibility of applying generally any element to the support structure.

Also, the fact that the construction of such support structure is constant along the whole length of the structure itself, allows achieving such engagements of the various elements in the zones considered as more suitable.

Finally, it is clear that the described embodiments of the seat according to the present invention are susceptible of modifications and variations, without departing from the scope of the invention. For example, in addition to the variants already described hereinabove, the following may be added:

the possibility of manufacturing the support structure 10 or 11 or the elements 52 also by molding, or of a sufficiently rigid plastic material, by means of molding or extrusion, or also of fiberglass-reinforced plastic; the possibility to manufacture the support structure 10 or 11 with a profile which is a mirror-image of the section shown herein, i.e. with the opening 24 disposed towards the exterior and the cavity 28 disposed towards the interior of the seat, conveniently the ends of the springs 30 or 40 may be positioned in the said cavity 28, in which there may be positioned also the element 52 (which must not necessarily be fixed to the wall 29, but may be maintained mating also only by tight fit or by snap engagement) and the auxiliary element 46 may be inserted into the opening 24;

the possibility of realizing in another manner also the portions 22 and 23 of the structure 10 or 11, which portions may for example be inclined towards the interior of the structure itself;

the possibility of realizing not only of different positions of the opening 24 and the cavity 28, but also a larger number of such cavities and openings, in order to have also the possibility to position the auxiliary element 46 and the element 52, as well as the elements 61 or 64, in the same zone, fixed on each other, or in different zones individually; and the possibility of realizing the support structure with the stuffing already applied directly thereon.

What I claim is:

1. A seat for vehicles comprising a support structure for a seat cushion, a support structure for a seat back, and respective stuffing parts at least partially supported by said structures; said support structures each having an inner surface configured to receive and be engaged by an element, such as a spring, forming a part of said seat; each of said support structures having an outer surface which includes a recessed zone adapted to receive and restrain therein an auxiliary element, said recessed zone having the configuration of a cavity with a restricted opening; said auxiliary element having a first portion adapted to be forced and snap-fastened into said zone and a second portion which acts as a cover element for the outer surface of said support structures, such that said auxiliary element contacts an end portion of a surface covering material for said stuffing, locks said material inside said zone and covers the outer surface of said support structures and the contiguous areas of said surface covering material.

2. A seat as claimed in claim 1, wherein each of said structures has a second recessed zone adapted to receive a portion of an additional element, said additional element being at least partially disposed in a plane which enables it to oppose forces parallel to the respective planes of said structures, said additional element having a portion of its surface of the same shape as and being fixed within said second recessed zone.

3. A seat as claimed in claim 2, wherein said additional element at least partially forms a portion of said support structures, allowing variation of the length and width of said seat cushion and seat back.

4. A seat as claimed in claim 2, wherein said recessed zone and said second recessed zone are coextensive.

* * * * *